United States Patent [19]
Lee et al.

[11] Patent Number: 6,045,675
[45] Date of Patent: Apr. 4, 2000

[54] METHOD FOR CONCENTRATING AQUEOUS TETRAFLUOROETHYLENE EMULSION BY ELECTRODIALYSIS AND ITS APPARATUS

[75] Inventors: Jung Min Lee; Jae Cheon Koh; Sang Jin Moon; Kwang Joo Kim; Hang Kyo Jin; Chul Ung Kim; Won Uook So, all of Taejeon, Rep. of Korea

[73] Assignee: Korea Research Institute of Chemical Technology, Rep. of Korea

[21] Appl. No.: 09/043,548

[22] PCT Filed: Jul. 18, 1997

[86] PCT No.: PCT/KR97/00142

§ 371 Date: Mar. 19, 1998

§ 102(e) Date: Mar. 19, 1998

[87] PCT Pub. No.: WO98/03561

PCT Pub. Date: Jan. 29, 1998

[30] Foreign Application Priority Data

Jul. 19, 1996 [KR] Rep. of Korea ...................... 96-29058

[51] Int. Cl.$^7$ .................................................. B01D 61/44
[52] U.S. Cl. ........................... 204/518; 204/553; 204/627
[58] Field of Search .................................. 204/553, 518, 204/627

[56] References Cited

U.S. PATENT DOCUMENTS 2,247,065  6/1941  Pauli et al. .
4,758,320  7/1988  Sanchez et al. .

FOREIGN PATENT DOCUMENTS

WO 92/21433  12/1992  WIPO .

OTHER PUBLICATIONS

Yavzina et al., Electrophoretic concentration of aqueous suspensions of poly(tetrafluoroethylene). Abstract only, (no month) 1969.

*Primary Examiner*—Arun S. Phasge
*Attorney, Agent, or Firm*—Browning Bushman

[57] ABSTRACT

The present invention relates to a method and an apparatus for concentrating an aqueous PTFE emulsion in which a raw, aqueous PTFE emulsion containing fluorinated surfactants is concentrated by an electrodialysis technique using at least one nonionic surfactant as an anti-flocculation agent and a volatile electrolyte such that the formation of floccules is prevented.

9 Claims, 1 Drawing Sheet

METHOD FOR CONCENTRATING AQUEOUS TETRAFLUOROETHYLENE EMULSION BY ELECTRODIALYSIS AND ITS APPARATUS

This application is a 371 of PCT/KR97/00142, filed Jul. 18, 1997.

BACKGROUND OF THE INVENTION

1. Field of the Invention

This invention relates to a method and apparatus for concentrating an aqueous polytetrafluoroethylene (hereinafter "PTFE") emulsion. Particularly, it relates to a rapid method of concentrating aqueous PTFE emulsion without the formation of any kind of coagulating material and an apparatus for such method.

2. Description of the Prior Art

Aqueous PTFE emulsion is well known as a raw material for glossy agents, films, metal coatings, and ceramic coatings, etc. The aqueous PTFE emulsion to be commercially interesting has 60% of polymeric solids content, while the solid polymer content of PTFE emulsion prepared by emulsion polymerization is below 30% by weight polymeric solids. Therefore, in order to increase the solids content, it is necessary to use a process for concentrating aqueous emulsions prepared by emulsion polymerization reactions. Traditional concentration methods of emulsions are carried out by sedimentation, vaporization, and adsorption methods using nonionic or cationic surfactants. The sedimentation method concentrates emulsions by precipitating solid polymer by means of a non-ionic or anionic surface active agent. The sedimentation method using ionic surfactant exhibits the phenomenon that the flocculated particles, via peptizing of the inactive dispersing agent, become emulsified again when the excess water in the upper layer is eliminated after the sedimentation (U.S. Pat. No. 2,478,229). Furthermore, concentration methods using a surfactant require diluting the emulsion in the early stage in order to prevent the flocculation phenomena of the emulsion using the sedimentation method and ultimately require a long concentration time. Also, the method using a nonionic surfactant exhibiting the phenomenon of solubility inversion above certain temperatures has been carried out for the concentration of aqueous PTFE emulsions. It is necessary to concentrate the emulsion by heating to 50–80° C., by dissolving the surfactant in the emulsion, and by adding a small amount of electrolytes (Canadian Patent No. 536,455). As the concentration does not occur without adding the electrolyte or heating in this method, because of the stability of emulsion, it is impossible to obtain an emulsion with high solids concentration. This method, in fact, has difficulty in controlling the amount of electrolytes, because of the concentration of electrolytes being changed in very narrow temperature range. There are also concentration methods by absorbing water using water-insoluble adsorption agents, such as silica gel or ion exchange resins (U.S. Pat. No. 3,668,167). It is also known to carry out the concentration of the emulsion by vaporization of water under reduced pressure after stabilizing the emulsion; however, it is difficult to avoid the formation of foams and overheating (U.S. Pat. No. 3,316,201). The methods described above are very hard to apply to emulsions containing 30% solids content, but also are very difficult to avoid flocculation of the emulsion. Furthermore, concentration methods using a large quantity of surfactants make it necessary to recover surfactants contained in water, and need post-treatment processes for separating or treating wastes after concentration. For conducting this process, much energy is required, and environmental contamination is a problem. In addition, there are other problems such that the rate of treating PTFE is low and fluorinated surfactants inherently contained in the PTFE raw emulsion cannot be recovered.

SUMMARY OF THE INVENTION

To solve the above-mentioned problems, the inventors of the present invention developed a new process and apparatus of concentrating PTFE emulsion by an electrolysis treatment that enables treatment of the PTFE emulsion faster than the conventional methods and permits the recovery and regeneration of fluorinated surfactants contained in the PTFE raw materials.

A purpose of the present invention, therefore, is to provide a method and an apparatus for concentrating an aqueous PTFE emulsion characterized in that an aqueous PTFE emulsion having from 2–40% by weight of PTFE polymeric solid content is concentrated, preferably to a concentration of 70% by weight or greater PTFE polymeric solids, by an electrodialysis method using a nonionic surfactant as an anti-flocculation agent, the nonionic surfactant being at least one of polyethylene glycol alkyl ethers and t-octylphenoxy polyoxyethylene ethers, and a volatile electrolyte. Using the present invention, the formation of floccules is avoided.

Another purpose of the present invention is to provide an apparatus for concentrating an aqueous PTFE emulsion characterized in that the apparatus comprises a storage tank 1 for PTFE raw emulsion, an intermediate tank 2, an electrodialysis apparatus 3 that contains electrodes 4 and 4' connected to an electric power supply 7 and at least one membrane 8 between the electrodes 4 and 4', and a storage tank 5 of concentrated emulsion.

BRIEF DESCRIPTION OF THE DRAWING

FIG. 1 is a schematic drawing of the apparatus of the invention wherein:

Figure 1:
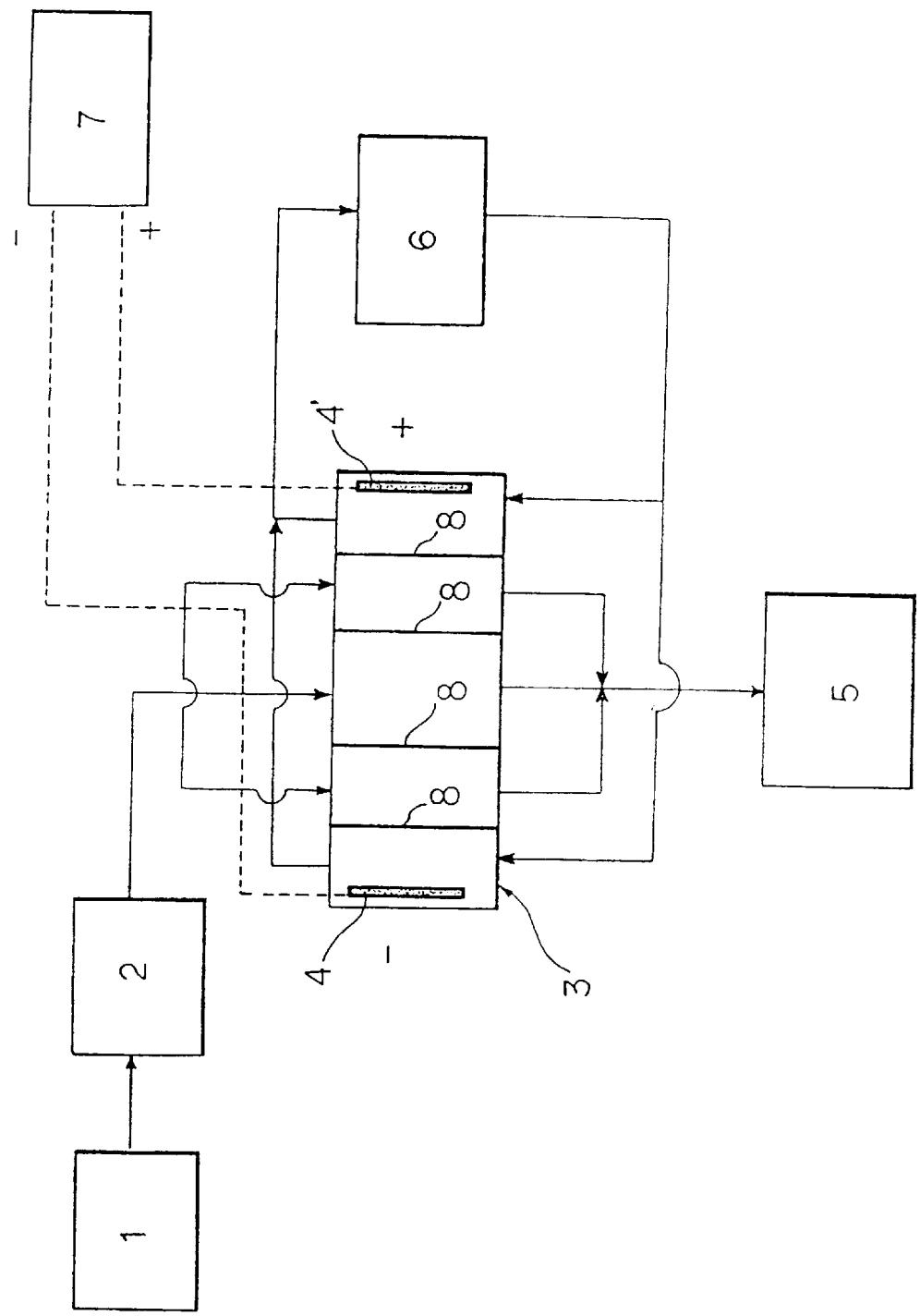

Item 1 is a storage tank of raw material PTFE emulsion;

Item 2 is an intermediate tank;

Item 3 is an electrodialysis apparatus;

Items 4, 4' are electrodes;

Item 5 is a storage tank of concentrated emulsion;

Item 6 is an electrolyte storage tank;

Item 7 is an electric power supplier; and

Item 8 is multilayer membranes.

DESCRIPTION OF THE PREFERRED EMBODIMENTS

A PTE emulsion generally contains polymer particles of about 300 nanometers, which are suspended in a colloidal state, the sedimentation of the stabilized particles does not occur, even though left for a long time, due to repulsion of particles by the anionic surfactant adhered to the particle surfaces and the anionic surfactant present in the solution.

This invention is to concentrate the emulsion by precipitation, eliminating anionic surfactant existing in the surface of the emulsion particles and nonionic surfactant existing in water and water by electrodialysis, as using the properties with anionic charge for PTFE emulsions prepared from polymerization.

Electrodialysis is the method to concentrate the aqueous colloidal particles by applying an electrical charge to the suspension. By charging an electric current to the suspension, the colloidal particles with electric charge are transferred horizontally to the electrode with opposite electric charge. A concentrated colloidal layer on the surface of the vertical membrane is formed by interruption of the transferred colloidal particles at the vertically disposed membrane. As the colloid is precipitated by gravity, the solution is concentrated.

In this invention, by subjecting PTFE emulsions to electrodialysis, PTFE colloidal particles are transferred to the positive electrode. As PTFE colloidal particles are migrating to the positive electrode, concentration occurs at the surface of the membrane spaced at constant intervals. The nonionic surfactant prevents PTFE colloids from adhering to the membrane in the concentration process, and the precipitation is accelerated without coagulation of PTFE colloid in the region of the membrane. After precipitation, concentrated PTFE emulsion with above 70% by weight solids content is obtained by recovering it from the water layer. The concentrated emulsion does not show the flocculation of particles by using the electrodialysis apparatus of this invention.

In this invention, it is important that adhering of the emulsion to the membrane surface can be prevented by using a nonionic surfactant, and the coagulation of particles in the concentrated emulsion can also be eliminated, when the electric charge of the emulsion becomes neutral. A volatile electrolyte is used in the electrode cells. As is known, a volatile electrolyte is one that when decomposed produces gaseous components when subjected to electrolysis. Thus, ammonium chloride decomposes to $NH_4$ and HCl. Obviously, a volatile component, such as triethylammonium carbonate, that decomposes into volatile, nontoxic components would be preferred. The anionic surfactant transferred from the emulsion can be easily recovered from the electrolyte.

The phenomenon of the colloidal particles adhering to the membrane surface, which can occur in the concentration process by electrodialysis, can be prevented by adding a nonionic surfactant, such as Triton X-100. Polyethylene glycol alkyl ethers can also be used.

The experiments below were carried out with the electrodialysis apparatus manufactured according to this invention. The interval between the membrane was adjusted in the range of from 0.3 cm to 3 cm, and the surface of the membrane was 20 $cm^2$. The membrane was set up between electrolyte and emulsion solution, and also can be set up as multilayer to increase the efficiency of concentration. The material of the electrode used was platinum.

In the process of this invention described above, the apparatus as shown in FIG. 1 was used, and the apparatus of this invention according to FIG. 1 is composed of the following items: storage tank (1) for raw material PTFE emulsion; intermediate tank (2) to feed surfactant for pH control; electrodialysis apparatus (3); storage tank for concentrated emulsion (5) flowing out from above electrodialysis apparatus (3), which has separated from aqueous solution of upper layer; electrolyte storage tank (6) in order to supplement the volatile electrolyte feed to electrodes (4); electric power supplier (7); and multilayer membranes (8). The transportation of emulsion through the system was carried out by pressure difference resulting from different pressures in the components (1), (2), (3), and (5), i.e., by gravity flow, and mechanical transportation devices such as pumps were not used. For instance, the various components were placed at gradually lower levels as follows: emulsion storage tank of raw material PTFB (1) (highest); intermediate tank (2); electrodialysis apparatus (3); and concentrated emulsion storage tank (5) (lowest). Also, the process is operated in either a batch or continuous fashion.

According to this invention, concentrated PTFE having the advantage above and its own inherent property of PTFE emulsion can be used as glossy agents, films for metal, ceramic coatings, etc.

To demonstrate the invention, the following non-limiting examples are presented:

EXAMPLE 1

A PTFE emulsion containing 25% by weight polymeric solids content from the storage tank (1) of raw material PTFE emulsion was fed to intermediate storage tank (2), and 5% by weight Triton X-100 (a t-octylphenoxy polyoxyethylene ether), based on polymeric solids content, was added to it. The pH was adjusted to 7 using ammonia solution and the solution was slowly agitated. The emulsion mixture of intermediate tank (2) was introduced into the center cell of the electrodialysis apparatus (3), which contained membranes passing only particles having a molecular weight above 1000. Then, 0.1 mole of volatile electrolyte was introduced to both of the electrode cells. A 10V voltage generated by electric supplier was charged to the cell, the membranes being spaced at 30 mm intervals, and the emulsion was concentrated for 80 minutes in the batch system.

In this case, the initial electric current density was 80 $mA/m^2$, and aqueous PTFE emulsion was concentrated to 70% by weight by polymeric solids content.

EXAMPLES 2–5

These experiments were carried out under the same conditions as Example 1, except that the concentration of the emulsion in tank 1 was varied, as were initial electric current density, voltage, and concentration time. The conditions and results are summarized in Table 1. The concentration time means the time required for concentrating PTFE emulsion to 70% by weight polymeric solids content.

TABLE 1

Result for the Concentration of PTFE Emulsion by Changing the Voltage

| Example | Fed Emulsion Concentration (wt %) | Initial Electric Current Density ($mA/m^2$) | Voltage (V) | Concentration Time (min.) |
|---|---|---|---|---|
| 2 | 30 | 90 | 20 | 65 |
| 3 | 25 | 160 | 40 | 58 |
| 4 | 50 | 280 | 60 | 26 |
| 5 | 40 | 200 | 70 | 31 |

EXAMPLES 6–9

These experiments were carried out under the same conditions of Example 1, with the exception of changing concentration of fed emulsion, initial electric current density, voltage, and concentration time. The membrane interval was 7 mm instead of 30 mm, as in Example 1. The conditions and results are summarized in Table 2. The concentration time is the time required for concentrating PTFE emulsion to 70% by weight polymeric solids content.

TABLE 2

The Results for PTFE Concentration, When the Membrane Interval Is 7 mm

| Example | Fed Emulsion Concentration (wt %) | Initial Electric Current Density (mA/m$^2$) | Voltage (V) | Concentration Time (min.) |
|---|---|---|---|---|
| 6 | 25 | 87 | 20 | 15.0 |
| 7 | 15 | 160 | 40 | 5.0 |
| 8 | 6 | 245 | 60 | 5.1 |
| 9 | 4 | 280 | 70 | 4.2 |

EXAMPLES 10–13

These experiments were carried out under the same conditions of Example 1, with the exception of changing the concentration of fed emulsion, initial electric current density, voltage, and concentration time. The concentration time is the time required for concentrating PTFE emulsion to 70% by weight polymeric solids content. The conditions and results are summarized in Table 3.

TABLE 3

The Results for PTFE Concentration, When the Membrane Interval is 0.5 mm

| Example | Fed Emulsion Concentration (wt %) | Initial Electric Current Density (mA/m$^2$) | Voltage (V) | Concentration Time (min.) |
|---|---|---|---|---|
| 10 | 2 | 250 | 20 | 6.8 |
| 11 | 10 | 300 | 40 | 3.5 |
| 12 | 40 | 320 | 60 | 1.5 |
| 13 | 30 | 320 | 70 | 1.3 |

EXAMPLE 14

These experiments were carried out under the same conditions of Example 1, with the exception of using polyethylene glycol alkyl ether instead of nonionic surfactant, as Triton X-100 in Example 1. When below 5% by weight nonionic surfactant by weight of PTFE emulsion was used, PTFE colloid adhered to the membrane of electrodialysis apparatus. The adhering phenomenon disappeared when above 5% by weight nonionic surfactant was used.

EXAMPLE 15

The experiment was carried out under the same condition or Example 1, with the exception of changing the pH of PTFE emulsion to 2, 4, 10, and 12. The required time to concentrate the PTFE emulsion to 70% by weight for the pH of 2, 4, 10, and 12 was 95, 75, 85, and 80 minutes, respectively.

EXAMPLE 16

Continuous concentration was carried out by feeding a PTFE emulsion with a 25% by weight polymeric solids content, stored at storage tank of raw material PTFE emulsion (1) to intermediate tank (2), and feeding 5% by weight Triton X-100 based on polymeric solids content to tank (2) under gentle agitation, adjusting pH of emulsion to 7 by using ammonia solution, and then feeding emulsion mixture of intermediate tank (2) to respective cells of electrodialysis apparatus at a rate of 3 cc/min. by the elevation difference of the components. Membranes passing the material with molecular weight above 1000 were set and divided into many parts by multilayer membranes (8) in electrodialysis cell (5). 0.1 mole of volatile electrolyte was fed to both electrode cells, and 30V of voltage by electric power supplier was charged into a cell composed of three compartments, with 30 mm interval between membranes.

The PTFE emulsion was concentrated into 60–70% by weight polymeric solids content.

According to the present invention, the fluorinated surfactants present in the PTFE emulsion can be recovered and reused, and the concentration of the PTFE emulsion can be achieved in a much shorter time—e.g., 10 minutes—as opposed to conventional methods, which may require 6 hours or longer.

What is claimed is:

1. A method for concentrating an aqueous PTFE emulsion containing 2–40% by weight of PTFE polymeric solid content, characterized by adding to the aqueous PTFE emulsion at least one nonionic surfactant, adjusting the pH thereof, feeding the resulting emulsion to a membrane cell for electrodialysis, said cell containing electrodes 4 and 4' immersed in an electrolyte solution containing a volatile electrolyte, and subjecting the resulting emulsion to an electrodialysis treatment.

2. The method of claim 1 wherein said pH is adjusted from an acid pH to a pH of 7 or greater.

3. The method for concentrating an aqueous PTFE emulsion according to claim 1, characterized in that said membrane is a cellulose membrane that can pass molecules having a molecular weight of more than 1,000.

4. The method for concentrating an aqueous PTFE emulsion according to claim 1, characterized in that the electrodialysis is performed with an electric current density of 90–320 mA/m$^2$.

5. The method for concentrating an aqueous PTFE emulsion according to claim 1, characterized in that said nonionic surfactant is selected from polyethylene glycol alkyl ethers or tert-octylphenoxy polyoxyethylene ether and is added in an amount of more than 5% by weight based on the PTFE polymeric solid content of the PTFE emulsion.

6. The method for concentrating an aqueous PTFE emulsion according to claim 1, characterized in that the electrodialysis is performed with an electric field intensity of 2–60 V/cm between membranes.

7. A method for concentrating an aqueous PTFE emulsion having 2–40% by weight of PTFE polymeric solid content, characterized in that it comprises adding at least one nonionic surfactant selected from polyethylene glycol alkyl ethers and t-octylphenoxy polyoxyethylene ethers to the aqueous PTFE emulsion, adjusting the pH of the resulting emulsion, feeding the resulting emulsion to a membrane cell for electrodialysis and performing an electrodialysis treatment, wherein said membrane cell is separated by at least one membrane arranged with a predetermined interval and electrodes 4 and 4' are immersed in said cell, wherein the electrodialysis treatment is continuously performed while using pressure differences resulting from the differences of the levels of a storage tank of PTFE raw emulsion 1, an intermediate tank 2, an electrodialysis apparatus 3, and a storage tank of concentrated emulsion 5.

8. An apparatus for concentrating an aqueous PTFE emulsion comprising a storage tank 1 for PTFE raw emulsion, an intermediate tank 2 connected to tank 1, an electrodialysis apparatus 3 connected to tank 2, a storage tank 5 connected to electrodialysis apparatus 3, electrodes 4 and 4' being disposed in apparatus 3, an electric power supply 7 connected to electrodes 4 and 4', and at least one membrane 8 disposed between electrodes 4 and 4', tank 1, tank 2, electrodialysis apparatus 3, and tank 5 being disposed at successively lower levels, means for flowing said emulsion from tank 1 to tank 5 and through tank 2 and electrodialysis apparatus 3, and further including means for adjusting the pH of said emulsion.

9. The apparatus of claim 8 wherein tank 1 is in open communication with tank 2, tank 2 is in open communication with apparatus 3, and apparatus 3 is in open communication with tank 4 whereby there is continuous flow from tank 1 to tank 2, from tank 2 to apparatus 3, and from apparatus 3 to tank 4.

\* \* \* \* \*